July 16, 1935.  G. A. MATHIEU  2,008,289

RADIO OR OTHER HIGH FREQUENCY RECEIVER

Filed March 19, 1932  3 Sheets-Sheet 1

INVENTOR
GASTON A. MATHIEU
BY
ATTORNEY

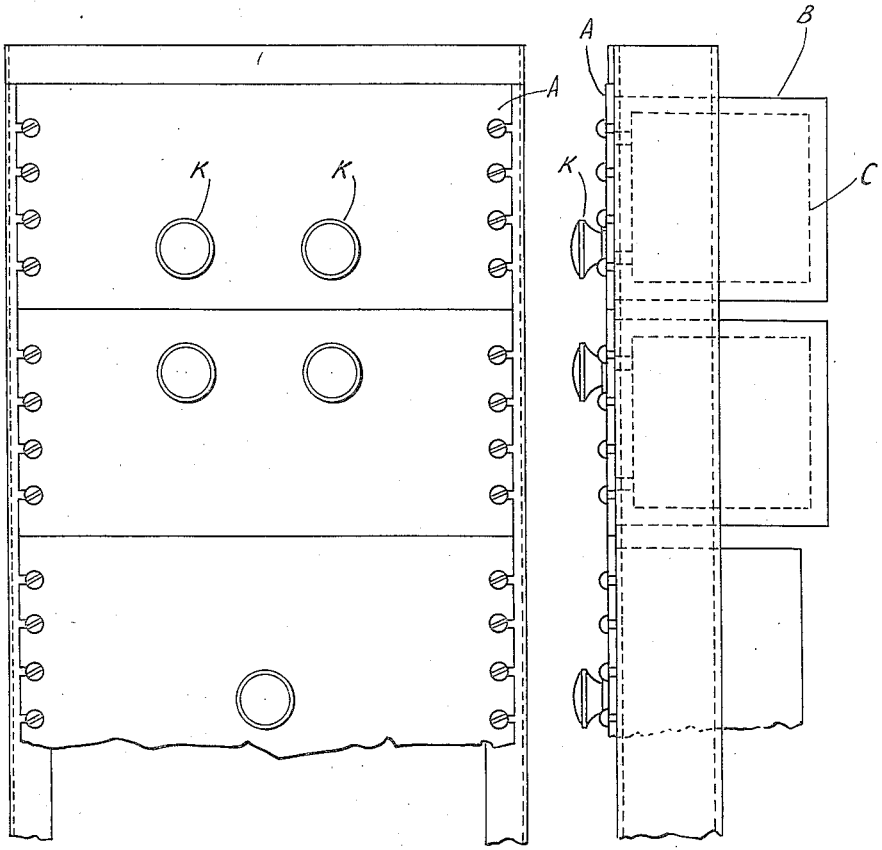

Patented July 16, 1935

2,008,289

UNITED STATES PATENT OFFICE 2,008,289

RADIO OR OTHER HIGH FREQUENCY RECEIVER

Gaston Adelin Mathieu, London, England, assignor to Radio Corporation of America, a corporation of Delaware Application March 19, 1932, Serial No. 600,013
In Great Britain April 7, 1931

8 Claims. (Cl. 250—14)

This invention relates to high frequency receivers.

The invention is particularly applicable to receivers suitable for receiving ultra-short waves of the order of 20 meters and below and though not limited thereto the said invention is primarily applicable to short wave receivers of the kind including amplifiers, frequency changing, heterodyne oscillator, and intermediate frequency amplifier circuits.

The invention embodies constructional and mechanical details and has for its main objects to provide a simple construction which can be easily manufactured and in which the length of the connections are reduced as much as possible and the effects of stray capacities are reduced to a minimum.

A further object is to provide a construction allowing the interchange of units or the inspection thereof to be easily effected.

The invention provides a method of construction which is particularly well adapted for use in connection with a receiver in accordance with the invention contained in the specification accompanying Patent No. 1,968,610.

According to the principal feature of the invention the various components of a high frequency receiver are mounted on metal sub-panels and these sub-panels are adapted to be inserted in screening boxes a plurality of which are mounted in a rack which forms the basis of a complete system of receiving installation.

The invention relates also to means for providing suitable screening between the units.

The high frequency tuning condenser (or condensers) and inductance (or inductances) are mounted on opposite sides of the metal sub-panel, which also carries the auxiliary high frequency blocking and by-pass condensers chokes and valves.

Preferably the tuning condenser (or condensers) carried by the sub-panels also form the carriers for the inductance or inductances associated therewith, and for coupling or other condensers also associated therewith, the said inductance or inductances being located on the side of the sub-panel remote from that upon which the variable condenser or condensers is or are located one or more windows being cut in the said sub-panel to permit the carrier member or members for the inductance or inductances to pass through and to avoid stray capacity between the portions of the condenser or condensers subjected to high frequency potentials and the sub-panel which is earthed as regards high frequency potentials.

Figure 1:
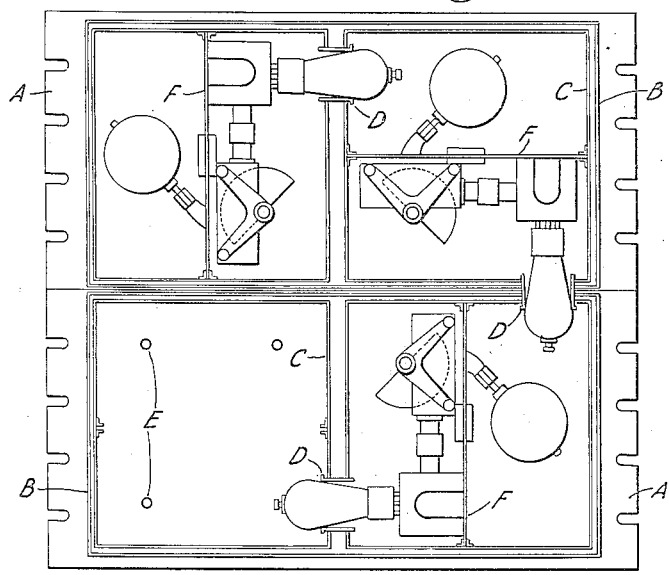
Figure 5:
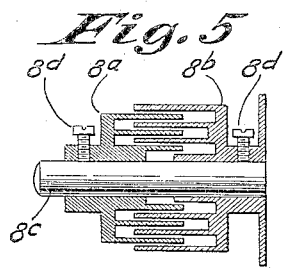
Figure 6:
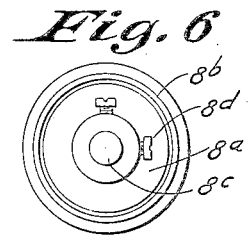
Figure 2:
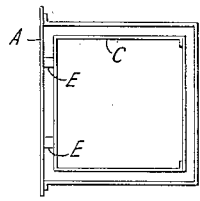
Figure 3:
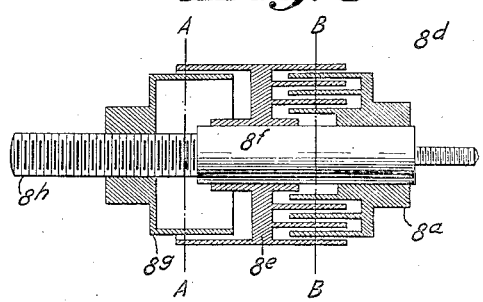

The invention is illustrated in the drawings in which Figure 1 shows in rear schematic view a main panel carrying four screening boxes, Figure 2 is a view taken at right angles to Figure 1, and showing the arrangement of screening boxes with relation to the main panel. Figure 3 shows in longitudinal section and Figure 4A in end section on the line A—A of Figure 3, and Figure 4B in end section on the line B—B of Figure 3, a preferred form of combined coupling and neutralizing condenser suitable for use in carrying out the present invention. Figure 5 shows in sectional elevation and Figure 6 in end view, a form of simple coupling condenser also applicable for use in carrying out the present invention. The Figures 7, 8 and 9 of the drawings illustrate preferred constructions of sub-panel with apparatus mounted thereon and adapted to be carried in one of the screening boxes shown in Figure 1. Figure 10 shows a front elevation of the complete receiver mounted on a rack. Figure 11 shows a side elevation of Figure 10.

Referring to the drawings and more particularly to Figure 1 a normal telephone metal panel A of the usual construction and adapted for rack mounting, carries one or more screening boxes C the side walls of which are provided with grooves or equivalent means adapted to receive a subpanel F which may be slid in so as to take up the position shown. These sub-panels F each of which carries apparatus associated with one of the various stages will be described in detail later. The metal boxes C are semi-permanently fixed in position by means of screws, said screws passing through distance washers or bushes E serving to space the screening boxes from the panel, as shown in Figure 2. The space left between the panel and the screening box is utilized for housing the conductors supplying energy to the various components as necessary, the low tension, high tension, and bias potential supply leads being constituted by screened cables permanently carried between the screening boxes and the back of the main panel. These connection leads are permanently connected to suitable socket members in an insulating block (not shown) which is attached to the main panel and as will be seen later the necessary potentials are applied to the components carried by the sub-panels by means of co-operating contact members carried in an insulating block fixed to each sub-panel. The bushes E are soldered permanently to the screening boxes so as to permit these boxes to be easily and readily removed from the main panel without there remaining any loose parts.

Figure 7:
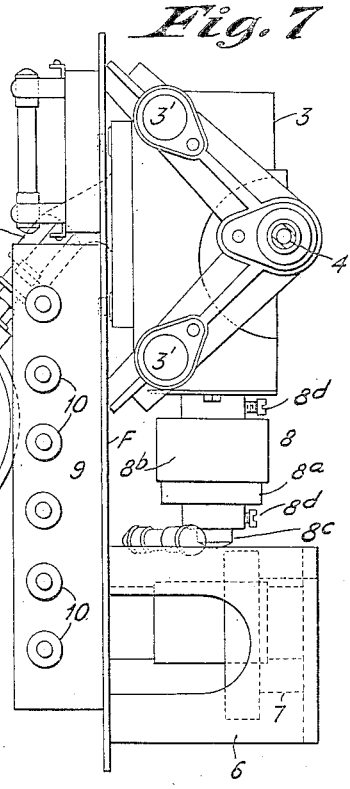
Figure 8:
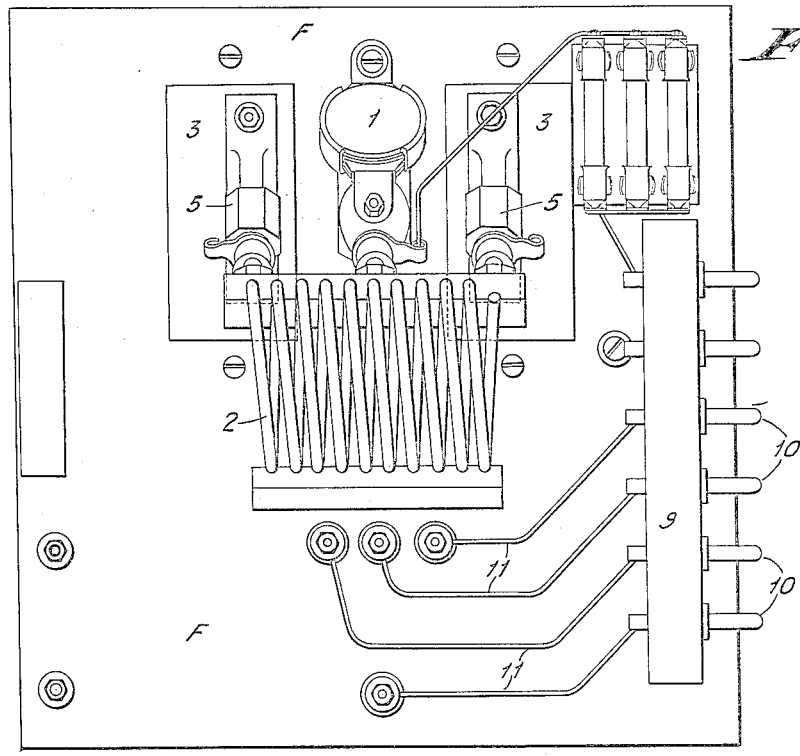
Figure 9:
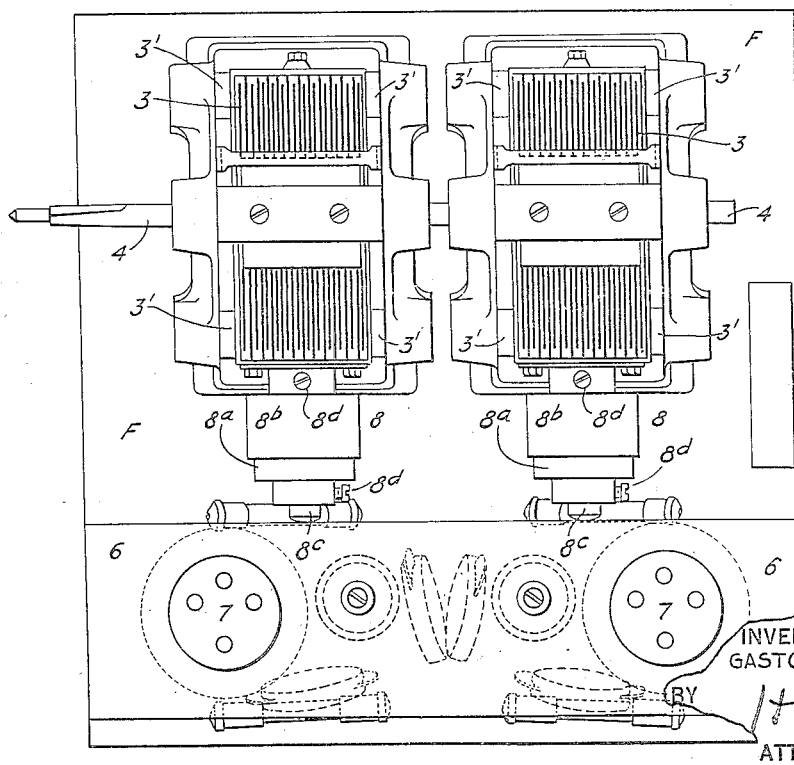

Referring now more particularly to Figures 7, 8 and 9 showing an assembled sub-panel, the sub-panel illustrated is that of a high frequency stage comprising a pair of valves in symmetrical arrangement the sub-panel itself constituting the neutral point to which is connected through a condenser 1 the centre tapping of an inductance 2 said inductance being tuned by a pair of similar variable condensers 3 ganged on the same shaft 4 and having their rotors which also constitute the neutral point, connected to the sub-panel. As will be seen, beneath the stators of the variable condensers 3 are windows cut in the panel, said windows permitting carrier members 5 attached to the stators of the condensers 3 to pass through sub-panels F and thus to carry the input coil. Also mounted on the sub-panel F is a metal sub-frame 6 upon which are mounted valve holders 7. The usual chokes, resistance, and condensers are carried beneath the sub-frame 6 as shown. The stators of the condensers 3 are insulated by glass insulators 3' and are connected to the ends of the input coil, and coupled to the grids of the valves through coupling condensers 8 fixed directly to the said stators as shown. The construction of one of these coupling condensers is shown in detail in Figures 5 and 6 of the drawings. As will be seen each condenser 8 comprises a male and female member 8a 8b the female member being fixed to the stator of the condenser 3 and the male member being carried upon an insulating rod 8c which passes through the central aperture in the female member and a corresponding central aperture in the male member. It will be appreciated that when the condensers 8 are in position the end of the insulating rod 8c may abut against the face of the stator of the appropriate condenser 3 and the capacity of each coupling condenser may be adjusted by adjusting the degree of entry of the male member into the female member said adjustment being maintained by set screws 8d biting upon the central insulating rod.

As will be seen the input coil is carried at an angle and in this way space is economized while the said coil is located below the cut away portion of the sub-panel. 9 is an insulating block having plugs 10 co-operating with sockets in the member (not shown) carried on the main panel, said plugs being permanently connected by wires 11 and serving for the supply of low tension and high tension and grid bias potential to the various components carried upon the sub-panel. The sub-panel acts as the earth connection.

A similar type of construction is employed for all the stages in a receiving set and coupling between the various stages e. g. between high frequency stages, is effected in different ways according to the nature of the circuit employed. For example, in the case of a high frequency stage comprising screened grid valves, the said valves project through suitable apertures from one screening box into the next as shown in Figure 1 of the drawings, the said apertures being provided with easily assembled tubes D which assist in perfecting the screening. Where ordinary triodes are employed the coupling from the apparatus in one screening box to that in another may be made by tubular condensers constructed, for example, in manner similar to that above described with reference to Figures 5 and 6 of the drawings.

The operating shaft of the ganged variable condensers is formed with a flat or keyed surface as indicated so that a handle K, as shown in Figs. 10 and 11, may be fixed permanently on the other side of the main panel, the relative setting of the handle and the condenser armatures being therefore determined by the location of the flat or keyed surface.

Figure 4A:
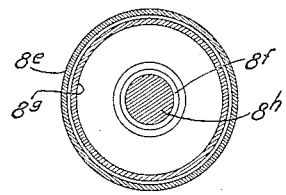
Figure 4B:
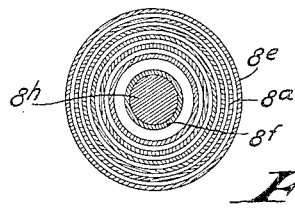

The whole set including a plurality of screening boxes is surrounded by the usual iron box B (Figure 2 of the drawings) an air space being left inside the said box B, as shown.

Where screened grid valves are not employed, but ordinary triodes are employed in high frequency stages, these triodes should, of course, be neutralized, and this will involve the use of additional neutralizing condensers. A suitable construction of combined coupling condenser and neutralizing condenser is shown in Figures 3, 4A and 4B of the drawings. This combined condenser includes a body portion 8e permanently fixed upon an insulating member 8f. One side of the body 8e co-operates with a member 8g to constitute a neutralizing condenser. As will be seen the member 8g is screwed upon a stem 8h so that a fine adjustment of neutralizing capacity is possible while there is a metallic connection passing right through the centre of the combined condenser unit, thus avoiding the necessity for comparatively long cross leads between the grids and the plates of the valves of the circuit.

The construction illustrated in the drawings may with considerable advantage be applied to a high frequency amplifier comprising a plurality of screened grid stages and preceding the frequency changer of a receiver in accordance with the invention described in the specification accompanying Patent No. 1,968,610.

As is set forth in the said specification, it may be desired to reduce the gain of a multi-stage high frequency amplifier preceding the frequency changer without at the same time reducing the selectivity and the said Patent No. 1,968,610 describes an arrangement adapted to this end and whereby when it is desired to reduce the gain of a high frequency amplifier the valve of one stage thereof is removed and replaced by a coupling condenser construction said construction being arranged with a valve pin base so that it fits into the valve socket from which the valve has been removed and thereby serves to couple the now valveless tuning stage to the succeeding stage. Figure 3 of the drawings shows a form of coupling condenser construction which is, with very slight modification, suitable for use in this manner as a coupling condenser to replace a valve which ordinarily couples two succeeding stages. The only modification required to the construction shown in the said Figure 3 is to mount the said construction on an insulated pillar of suitable length, said pillar being formed with or carrying at one end a valve pin base adapted to be plugged into the socket from which the valve has been removed, said base providing the necessary connections to the condenser coupling unit.

Where electromagnetic or electrostatic coupling to a stage situated in a screened box is required the wall or walls dividing that stage from the circuit to be coupled thereto may be provided with apertures through which the required electrostatic or electromagnetic coupling is obtained. For example, in a case where electrostatic coupling is required between successive stages situated in separate screening boxes this may be effected by means including a condenser one electrode of which is situated on one side of a dividing wall or walls between the two screening boxes and the other electrode of which is situated on the other side of the dividing wall or walls, both electrodes, of course, being opposite an aperture.

Electrostatic or electro-magnetic coupling obtained in this way through an aperture may be controlled by controlling the effective area of the aperture. This control of the effective area of an aperture may be obtained in various ways, for example, by means of an iris diaphragm such as is ordinarily employed in photographic cameras or by means of an adjustable apertured mask so positioned and arranged that by rotating the mask the apertures may be in effect closed to an adjustable extent. These means for varying electrostatic or electromagnetic coupling are particularly described in the specification accompanying Patent No. 1,968,610, Figure 4 of the drawings of which illustrates the apertured mask arrangement. Where the coupling is electromagnetic, wire gauze or the like may be fitted across the aperture so as to prevent electrostatic coupling. This arrangement is also described in the specification accompanying co-pending application. These arrangements for varying coupling without the necessity of moving coils or condenser electrodes present the considerable practical advantage that adjustment of coupling can be effected without disturbing symmetry.

Having now particularly described and ascertained the nature of my said invention and in what manner the same is to be performed, I declare that I do not claim in the present specification anything already claimed in the Patent No. 1,968,610 but that subject to this disclaimer, what I claim is:—

1. A high frequency receiving system having replaceable units adapted for rack mounting, comprising radio apparatus mounted upon metal sub-panels, a support rack for mounting said radio apparatus, a plurality of screening boxes having inside grooves, said sub-panels inserted in said grooves, said screening boxes being mounted on said rack which constitute a support for the complete receiving system installation.

2. A receiving system as claimed in claim 1 and in which each screening box contains a separate stage of amplication.

3. A high frequency receiving system having replaceable units adapted for rack mounting, comprising a support rack, a plurality of screening boxes for enclosing apparatus for separate amplifier stages, the apparatus for each of said stages being mounted upon a metal sub-panel inserted in said screening boxes the sub-panel having mounted on one side a tuning condenser and on the other side an inductance tuned by said condenser, a plurality of enclosing boxes surrounding said screening boxes and mounted on said rack which constitutes a support for the complete receiving system.

4. A high frequency receiving system having replaceable units adapted for rack mounting, comprising a support rack for mounting said replaceable units, a plurality of screening boxes for enclosing apparatus for separate amplifier stages, the apparatus of each of said stages mounted upon a metal sub-panel inserted in said screening boxes the sub-panel having mounted on one side a tuning condenser and on the other side an inductance which is tuned by said condenser, current carrying means for the inductances located on one side of the sub-panel remote from the tuning condenser, and a plurality of apertures in said sub-panel to permit the current carrier members for the inductances to pass through said panel, a plurality of enclosing boxes surrounding said screening boxes both boxes mounted on said rack which constitutes a support for the complete receiving system.

5. A high frequency receiving system having replaceable units adapted for rack mounting, comprising a support rack for mounting said units, a plurality of main mounting panels having a plurality of side slots for securing said panels to said rack, each of said main mounting panels having a plurality of screening boxes containing sub-panels on which apparatus for amplifier stages are mounted, said screening boxes being semi-permanently fixed to said main mounting panels.

6. A high frequency receiving system having replaceable units adapted for rack mounting, comprising a supporting rack for mounting said replaceable units, a panel mounted on said rack for securing a plurality of screening boxes for enclosing apparatus for amplifier stages, the apparatus of each of said stages mounted upon a sub-panel slidably inserted in said screening boxes, a plurality of enclosing boxes surrounding said screening boxes, said screening boxes being semi-permanently fixed in position on said panel by means of a plurality of screws passing through a plurality of bushings, said bushings arranged to space said screening boxes from said enclosing boxes, both of said boxes mounted on said rack which constitutes a support for the complete receiving system.

7. A high frequency receiving system having replaceable units adapted for rack mounting, comprising a support rack for mounting said replaceable units, a panel mounted on said rack for securing a plurality of screening boxes for enclosing apparatus for separate amplifier stages, the apparatus of each of said stages mounted upon a sub-panel slidably inserted in said screening boxes, a plurality of enclosing boxes surrounding said screening boxes which are semi-permanently fixed in position on said panel by means of a plurality of securing members passing through a plurality of bushings, said bushings arranged to space said screening boxes from said enclosing boxes, current carrying conductors supplying energy to said amplifier stages arranged on said rack within the space between said boxes and said panel.

8. A high frequency receiving system having replaceable units adapted for rack mounting, comprising a support rack for mounting said units, a panel mounted on said rack for securing a plurality of screening boxes enclosing apparatus for separate amplifier stages, the apparatus of each of said stages mounted upon a sub-panel inserted in said screening boxes, a plurality of enclosing boxes surrounding said screening boxes which are semi-permanently fixed in position on said panel by means of a plurality of securing members passing through a plurality of bushings, said bushings arranged to space said screening boxes from said panel, and means for coupling circuit elements of said stages contained within said screening boxes by effecting the circuit elements electromagnetically or electrostatically through an aperture in the walls of said boxes.

GASTON ADELIN MATHIEU.